(12) United States Patent
Roberge

(10) Patent No.: US 11,889,801 B2
(45) Date of Patent: Feb. 6, 2024

(54) MODULAR CONTAINER FOR GROWING PLANTS

(71) Applicant: CNH Industrial Canada, Ltd., Saskatoon (CA)

(72) Inventor: Martin J. Roberge, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 53 days.

(21) Appl. No.: 17/537,615

(22) Filed: Nov. 30, 2021

(65) Prior Publication Data
US 2023/0165197 A1 Jun. 1, 2023

(51) Int. Cl.
*A01G 9/02* (2018.01)
*G07C 9/00* (2020.01)

(52) U.S. Cl.
CPC ............. *A01G 9/027* (2013.01); *A01G 9/026* (2013.01); *G07C 9/00182* (2013.01)

(58) Field of Classification Search
CPC ........ A01G 9/027; A01G 9/02; A01G 9/0295; B65D 21/02; B65D 21/0201; B65D 21/0202; B65D 21/0204
See application file for complete search history.

(56) References Cited

U.S. PATENT DOCUMENTS

| | | | | |
|---|---|---|---|---|
| 2,219,870 A | * | 10/1940 | Jacobus | A01G 9/027 47/33 |
| 4,889,254 A | * | 12/1989 | Vola | A45C 7/0045 132/294 |
| 5,050,755 A | * | 9/1991 | Strawder | B65D 21/0202 220/909 |
| 5,381,916 A | * | 1/1995 | Strawder | B65D 21/0202 220/212.5 |

(Continued)

FOREIGN PATENT DOCUMENTS

WO   WO 2019157598   8/2019
WO   WO 2020154767   8/2020

OTHER PUBLICATIONS

Citycrop, Automated Indoor Farming, Rethinking Home Growing, product information page, dated 2020—5 pages https://www.citycrop.io/how-it-works/.

(Continued)

*Primary Examiner* — Kristen C Hayes
(74) *Attorney, Agent, or Firm* — Rebecca L. Henkel; Rickard K. DeMille

(57) ABSTRACT

A container for growing plants includes a bottom wall, a first side wall extending perpendicular to the bottom wall, and a second side wall extending perpendicular to the bottom wall and parallel to the first side wall such that the bottom wall, the first side wall, and the second side wall at least partially define a plant growing chamber. Furthermore, the container (Continued)

includes a lid configured to selectively occlude access to the plant growing chamber. Additionally, one of the bottom wall, the first or second side walls, or the lid includes a rail and another of the bottom wall, the first or second side walls, or the lid defines a groove such that the rail of the container is configured to be received within a groove of a first adjacent container and the groove of the container is configured to receive a rail of a second adjacent container.

18 Claims, 3 Drawing Sheets

(56) References Cited

U.S. PATENT DOCUMENTS

| | | | | |
|---|---|---|---|---|
| 5,699,925 | A * | 12/1997 | Petruzzi | B65D 21/0204 206/508 |
| 7,867,759 | B2 | 1/2011 | Teixeira | |
| 9,288,948 | B2 | 3/2016 | McNamara et al. | |
| 10,219,447 | B1 | 3/2019 | Decarli et al. | |
| 2011/0309072 | A1* | 12/2011 | Rio Gonzalez | B65D 11/1873 219/121.68 |
| 2014/0279181 | A1 | 9/2014 | Wills | |
| 2015/0175299 | A1* | 6/2015 | Huang | B65D 11/1833 220/4.29 |
| 2017/0050760 | A1* | 2/2017 | Tiramani | B65D 5/325 |
| 2019/0261577 | A1 | 8/2019 | Burford | |
| 2020/0039689 | A1* | 2/2020 | Leinbach | B65D 43/02 |

OTHER PUBLICATIONS

Heliponix, GroPod Smart Garden, product information page, dated 2020—5 pages https://gropod.io/products/gropod.

Biopod, How Biopod Works, product information page, dated 2021—3 pages https://www.biopod.com/learn/.

Factorypure, Dealzer Cash Crop 6.0 2 Plant LED Hydroponics Grow Box New—9 pages https://factorypure.com/products/dealzer-cash-crop-6-0-2-plant-led-hydroponics-grow-box-new.

\* cited by examiner

US 11,889,801 B2

MODULAR CONTAINER FOR GROWING PLANTS

FIELD OF THE INVENTION

The present disclosure generally relates to containers for growing plants and, more particularly, to a modular container for growing plants.

BACKGROUND OF THE INVENTION

As the world's population has increased and the amount of land available for farming has decreased, new farming techniques have been developed. One such technique is to grow crops or other plants within an urban area. In general, such farming operations use containers in which crops or other plants are grown. Specifically, these containers provide a suitable environment for growing crops in an area in which it would otherwise be difficult to grow crops (e.g., in a city). While such systems work well, additional improvements are needed.

Accordingly, an improved container for growing plants would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a container for growing plants. The container includes a bottom wall, a first side wall extending perpendicular to the bottom wall, and a second side wall extending perpendicular to the bottom wall and parallel to the first side wall such that the bottom wall, the first side wall, and the second side wall at least partially define a plant growing chamber. Furthermore, the container includes a lid configured to selectively occlude access to the plant growing chamber. Additionally, one of the bottom wall, the first side wall, the second side wall, or the lid includes a rail and another of the bottom wall, the first side wall, the second side wall, or the lid defines a groove such that the rail of the container is configured to be received within a groove of a first adjacent container and the groove of the container is configured to receive a rail of a second adjacent container.

In another aspect, the present subject matter is directed to an assembly of containers for growing plants. The assembly includes first, second, and third containers. Each container, in turn, includes a bottom wall, a first side wall extending perpendicular to the bottom wall, a second side wall extending perpendicular to the bottom wall and parallel to the first side wall such that the bottom wall, the first side wall, and the second side wall at least partially define a plant growing chamber. Moreover, each container includes a lid configured to selectively occlude access to the plant growing chamber. In addition, one of the bottom wall, the first side wall, the second side wall, or the lid of the first container includes a rail and another of the bottom wall, the first side wall, the second side wall, or the lid of the first container defines a groove. Furthermore, one of the bottom wall, the first side wall, the second side wall, or the lid of the second container includes a groove. Additionally, one of the bottom wall, the first side wall, the second side wall, or the lid of the third container includes a rail. In this respect, the rail of the first container is received within the groove of the second container and the groove of the first container receives the rail of the third container.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
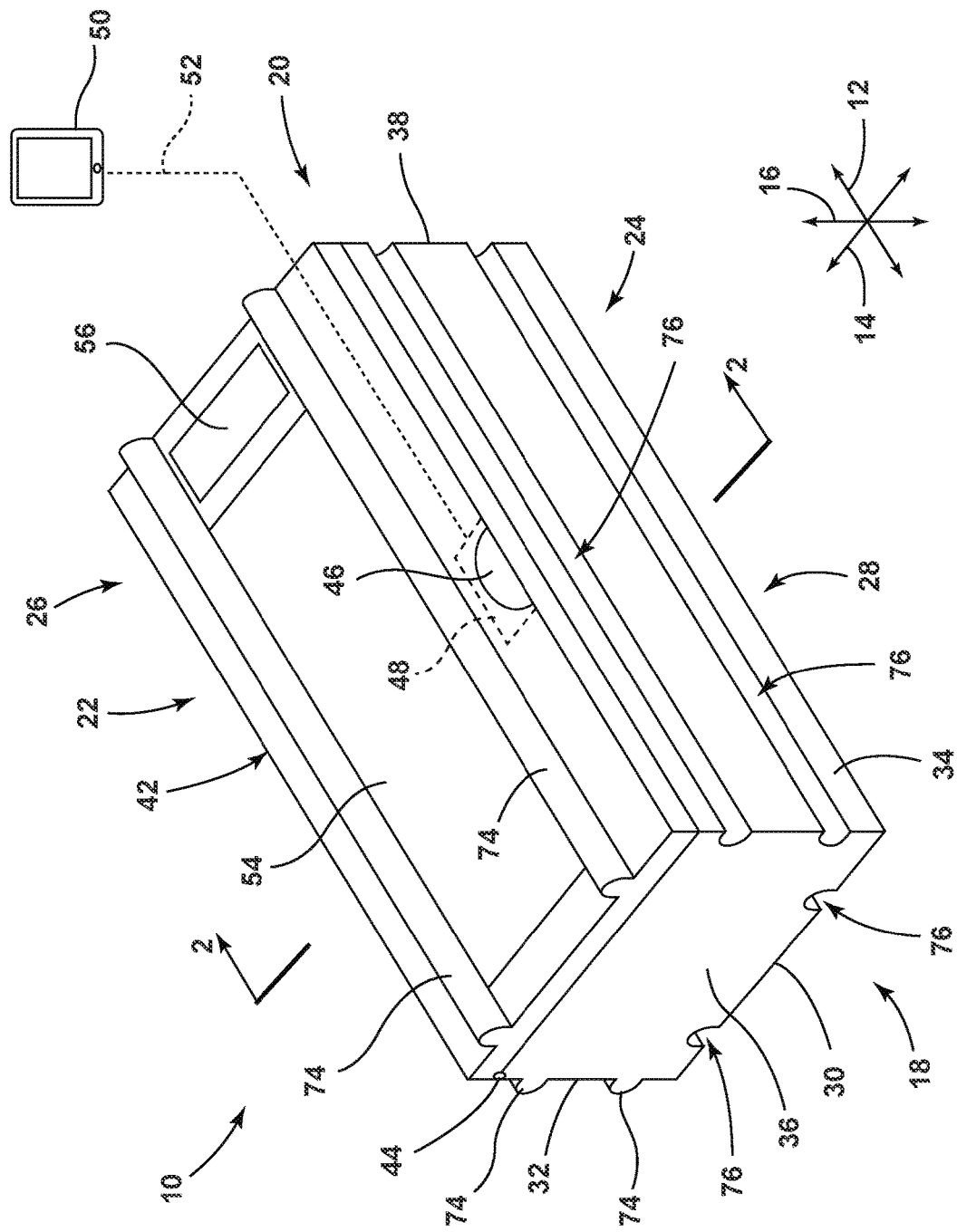
FIG. 1 illustrates a perspective view of one embodiment of a container for growing plants in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a container for growing plants. As will be described below, the container includes a bottom wall, a first side wall extending perpendicular to the bottom wall, and a second side wall extending perpendicular to the bottom wall and parallel to the first side wall. In this respect, the bottom wall, the first side wall, and the second side wall at least partially define a plant growing chamber in which plants (e.g., fruits, vegetables, herbs, etc.) are grown. Furthermore, the container may include a lid configured to selectively occlude access to the plant growing chamber.

Additionally, the container includes a plurality of features that allow the container to be removably coupled to other containers in an interlocked manner. In several embodiments, one of the bottom wall, the first side wall, the second side wall, or the lid includes a rail and another of the bottom wall, the first side wall, the second side wall, or the lid defines a groove. Specifically, the rail may extend outward from the exterior surface of the corresponding bottom wall, the first side wall, the second side wall, or the lid away from the plant growing chamber. Conversely, the groove may extend inward from the exterior surface of the corresponding bottom wall, the first side wall, the second side wall, or the lid toward from the plant growing chamber.

The rail and the groove improve the operation of the container. More specifically, the rail of the container is configured to be received within the groove of a first adjacent container. Similarly, the groove of the container is configured to receive a rail of a second adjacent container. Such engagement of the rails and the grooves of adjacent containers removably couples the containers together in an interlocking manner, thereby allowing for vertical and/or horizontal stacking of the containers. Such stacking of the containers increases the plant growing capacity of a small-scale urban farming operation without the large, fixed costs associated conventional urban farming operations (e.g., the costs of a greenhouse and its associated maintenance). For example, such stacking may be used in cold weather where plants are grown in the inner containers and the outer containers are used for insulation. Moreover, such removable coupling and stacking of the containers facilitates easy transportation of the containers, such as on a truck or airplane.

Figure 2:
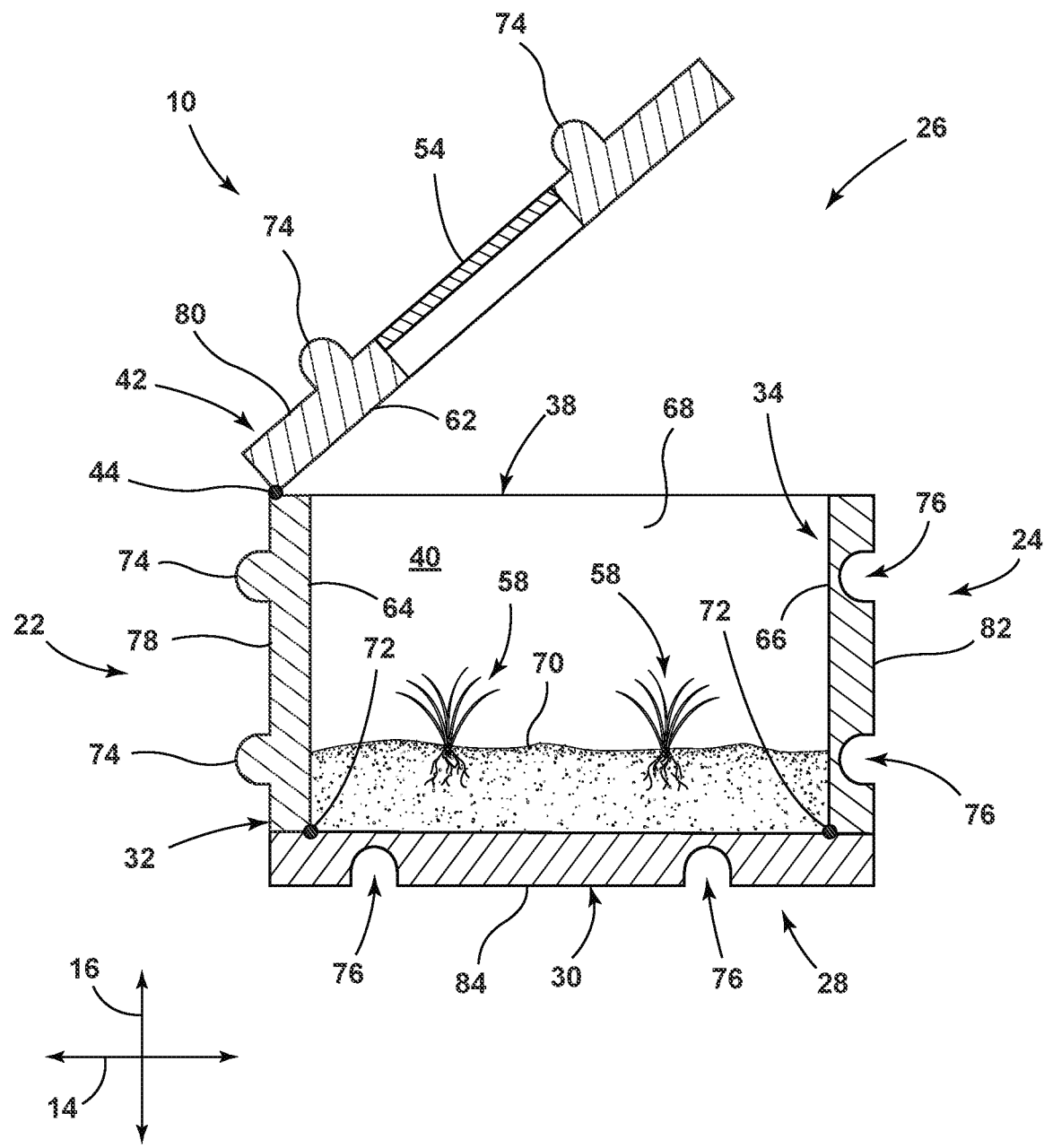
FIG. 2 illustrates a cross-sectional view of the container taken generally about Line 2-2 in FIG. 1.

Referring now to the drawings, FIGS. 1 and 2 illustrate differing views of one embodiment of a container 10 for growing plants. Specifically, FIG. 1 illustrates a perspective view of the container 10. Furthermore, FIG. 2 illustrates a cross-sectional view of the container 10 taken generally about Line 2-2 in FIG. 1. In general, the container 10 is a self-contained, modular apparatus configured to grow plants (e.g., vegetables, fruits, peppers, medicinal herbs, etc.) therein and protect such plants from harsh environments. As will be described below, the container 10 includes features that allow the container 10 to be removably coupled to adjacent containers in an interlocking or puzzle-like manner, thereby allowing stacking of the containers (e.g., in an indoor farming operation, on a truck bed, etc.).

As shown in FIG. 1, the container 10 defines a longitudinal direction 12, a transverse direction 14 orthogonal to the longitudinal direction 12, and a vertical direction 16 orthogonal to the longitudinal and transverse directions 12, 14. Specifically, the container 10 extends in the longitudinal direction 12 between a first end 18 of the container 10 and a second end 20 of the container 10. Moreover, the container 10 extends in the transverse direction 14 between a first side 22 of the container 10 and a second side 24 of the container 10. Additionally, the container 10 extends in the vertical direction 16 between a top end 26 of the container 10 and a bottom end 28 of the container 10.

Furthermore, as shown, the container 10 includes various walls. Specifically, in several embodiments, the container 10 includes a bottom wall 30 positioned adjacent to the bottom end 28 of the container 10. The container 10 also includes a first side wall 32 positioned adjacent to its first side 22 and extending perpendicular to the bottom wall 30. In addition, the container 10 includes a second side wall 34 positioned adjacent to its second side 24 and extending perpendicular to the bottom wall 30 and parallel to the first side wall 32. As such, the first and second side walls 32, 34 are generally spaced apart in the transverse direction 14. Moreover, in some embodiments, the container 10 includes third and fourth side walls 36, 38 respectively positioned adjacent to its first and second ends 18, 20. In this respect, the third and fourth side walls 36, 38 are positioned perpendicular to the bottom wall 30 and the first and second side walls 32, 34. Additionally, the third and fourth side walls 36, 38 are parallel to each other and spaced apart in the longitudinal direction 12. In one embodiment, the third and fourth side walls 36, 38 may be shorter in the vertical direction 16 than the first and second side walls 32, 34, thereby providing an opening for natural light and/or user access. Alternatively, the first, second, third, and fourth side walls 32, 34, 36, 38 may all have the same height in the vertical direction 16 as shown in FIG. 1. As will be described below, the various walls 30, 32, 34, 36, 38 of the container 10 define a plant growing chamber 40 (FIG. 2) in which the plants are grown.

As used herein, two components are perpendicular when oriented at an angle of ninety degrees plus or minus ten degrees. In addition, two components are parallel when oriented at an angle of zero degrees plus or minus ten degrees.

In some embodiments, the various walls 30, 32, 34, 36, 38 of the container 10 may be of the same shape and size such that the container 10 defines a square cube-like shape. Such a configuration generally reduces the manufacturing cost of the container 10. However, in alternative embodiments, the various walls 30, 32, 34, 36, 38 may have any other suitable shape and/or size.

Moreover, the container 10 includes a lid 42 positioned adjacent to its top end 26. In general, the lid 42 is configured to selectively occlude access to the plant growing chamber 40. Specifically, the lid 42 may be moveable between a closed position (e.g., as shown in FIG. 1) at which access to the plant growing chamber 40 is occluded and an opened position (e.g., as shown in FIG. 2) at which access to the plant growing chamber 40 is occluded. In this respect, as shown in FIG. 1, the lid 42 may generally be parallel to the bottom wall 30 when at the closed position. As such, in several embodiments, the lid 42 may be pivotably coupled to the top end of one of the side walls 32, 34, 36, 38 via a hinge 44. For example, in the illustrated embodiment, the lid 42 may be pivotably coupled to the top end of the first side wall 32 via the hinge 44. In addition, in some embodiments, the lid 42 may include a handle 46 that allows a user to move the lid 42 between the closed and opened positions.

In some embodiments, the lid 42 may include a locking assembly 48. In general, the locking assembly 48 is moveable between a locked position at which the locking assembly 48 prevents movement of the lid 42 from the closed position to the opened position and an unlocked position at which the locking assembly 48 permits movement of the lid 42 from the closed position to the opened position. As such, the locking assembly 48 have any suitable structure that allows the locking assembly 48 to function as described above. For example, in one embodiment, the locking assembly 48 may include a pin or bar-like member that is moveable into and out of a cavity.

The locking assembly 48 may be actuated in any suitable manner. For example, in one embodiment, the locking assembly 48 is configured to be remotely actuated by a remote device 50. In such an embodiment, the remote device 50 may transmit control signals to an actuator (e.g., a solenoid) of the locking assembly 48 via a communicative link 52 (e.g., Wi-Fi, Ethernet, 4G/5G/LTE, etc.). The control signals, in turn, instruct the actuator to move the locking assembly 48 between the locked and unlocked positions. In this respect, the remote device 50 may be any suitable computing device that is positioned remotely or otherwise positioned at a different location than the container 10, such as a Smartphone, tablet, laptop, desktop, or any other suitable processor-based device(s). Alternatively, the locking assembly 48 may be actuated locally and/or manually, such as via a key.

Furthermore, in one embodiment, the lid 42 may include a window 54. In general, the window 54 is a transparent portion of the lid 42 that allows light to enter the plant growing chamber 40. Such light may, in turn, allow the plants within the plant growing chamber 40 to grow and/or allow a user to view the plants growing chamber 40 while the lid 42 is at the closed position. However, in alternative embodiments, the lid 42 may be entirely opaque. Moreover, a window could be integrated into any one of the walls 30, 32, 34, 36, 38 in addition to or lieu of the window 54 in the lid 42.

Additionally, in one embodiment, the lid 42 may also include a user interface 56. In general, the user interface 56 may be configured to provide feedback associated with plant growing chamber (e.g., temperature, humidity, etc.) or the plants therein (e.g., their health, readiness to harvest, etc.) to the user. As such, the user interface 56 may include one or more feedback devices (not shown), such as display screens, speakers, warning lights, and/or the like, which are configured to provide such feedback to the operator. Moreover, some embodiments of the user interface 56 may include one or more input devices, such as touchscreens, keypads, touchpads, knobs, buttons, sliders, switches, microphones, and/or the like, which are configured to receive inputs from the user (e.g., to adjust the parameters of the crop growing chamber 40). Alternatively, the user interface 56 may be positioned at any other suitable location on the container 10 (e.g., on one of the walls 32, 34, 36, 38) or remote from the container 10. For example, when several containers are stacked together as will be described below, there may be a single user interface 56 for the several containers.

As mentioned above and shown in FIG. 2, the container 10 defines the plant growing chamber 40 in which one or more plants 58 are grown. In general, the bottom wall 30 and the first, second, third, and fourth side walls 32, 34, 36, 38 of the container 10 may define the plant growing chamber 40. Specifically, in several embodiments, the plant growing chamber 40 is defined in the vertical direction 16 between an inner surface 60 of the bottom wall 30 and an inner surface 62 of the lid 42 (when the lid 42 is at the closed position). Furthermore, in such embodiments, the plant growing chamber 40 is defined in the transverse direction 14 between an inner surface 64 of the first side wall 32 and an inner surface 66 of the second side wall 34. Additionally, in such embodiments, the plant growing chamber 40 is defined in the longitudinal direction 12 between an inner surface (not shown) of the third side wall 36 (FIG. 1) and an inner surface 68 of the fourth side wall 38.

The plant growing chamber 40 may be configured to contain any suitable substance(s) or material(s) that facilitate the growth of the plants 58 therein. For example, in the illustrated embodiment, the plant growing chamber 40 includes a growing substance 70, such as soil, sawmill, water (e.g., in the case of hydroponic growing of the plants 58), and/or the like.

In addition, the various walls 30, 32, 34, 36, 38 and the lid 42 may be collapsible to facilitate transportation of the container 10 prior to use. For example, the walls 30, 32, 34, 36, 38 and the lid 42 may be collapsed such that the container 10 is flat for transportation to the site where the container 10 will be used to grow plants. Once at the site, the walls 30, 32, 34, 36, 38 and the lid 42 may be moved to their assembled positions (e.g., as shown in FIGS. 1 and 2) such that the plant growing chamber 40 is defined therein. As such, in some embodiments, the container 10 may include joints 72 positioned between the walls 30, 32, 34, 36, 38 that permit movement of the walls 30, 32, 34, 36, 38 between the assembled and collapsed positions.

Referring now to FIGS. 1 and 2, at least one of the walls 30, 32, 34, 36, 38 or the lid 42 of container 10 includes one or more rails 74. Furthermore, at least another of the walls 30, 32, 34, 36, 38 or the lid 42 of container 10 defines one or more grooves 76. As will be described below, the rail(s) 74 of a given container are configured to be received within the groove(s) 76 of a first adjacent container. Similarly, the groove(s) 76 of the given container is configured to receive the rail(s) 74 of a second adjacent container. In this respect, the rail(s) 74 and the groove(s) 76 allow adjacent containers to be removably coupled together in an interlocked or puzzle-like manner, thereby facilitating horizontal and/or vertical stacking of the containers.

Any suitable wall(s) of the container 10 may include the rail(s) 74 and any other suitable wall(s) of the container 10 may define the groove(s) 76. For example, in the illustrated embodiment, the first side wall 32 includes a first pair of the rails 74 and the second side wall 34 defines a first pair of grooves 76. Moreover, in the illustrated embodiment, the lid 42 includes a second pair of the rails 74 and the bottom wall 30 defines a second pair of grooves 76. As such, the wall(s)/lid including the rail(s) 74 may be parallel to the wall(s)/lid defining the groove(s) 76.

The rail(s) 74 may correspond to any elongated projection extending outward from the exterior surface of one of the walls 30, 32, 34, 36, 38 or the lid 42 of the container 10. For example, in the illustrated embodiment, the rails 74 extend outward from an exterior surface 78 of the first side wall 32 and an exterior surface 80 of the lid 42 away from the plant growing chamber 40. Moreover, in the illustrated embodiment, the rails 74 extend along the entire length of the first side wall 32 and the lid 42. However, in alternative embodiments, the rails 74 may extend along only a portion of the length of the corresponding walls/lid.

Additionally, the groove(s) 76 may correspond to any elongated cavity or slot extending inward from the exterior surface of another of the walls 30, 32, 34, 36, 38 or the lid 42 of the container 10. For example, in the illustrated embodiment, the grooves 76 extend inward from an exterior surface 82 of the second side wall 34 and an exterior surface 84 of the bottom wall 30 toward the plant growing chamber 40. Furthermore, in the illustrated embodiment, the grooves 76 extend along the entire length of the second side wall 34 and the bottom wall 30. However, in alternative embodiments, the grooves 76 may extend along only a portion of the length of the corresponding walls/lid.

As mentioned above, the groove(s) 76 of one container is configured to receive the rail(s) 74 of another container. In this respect, the rail(s) 74 and the groove(s) 76 generally define complementary cross-sectional shapes. For example, in the illustrated embodiment, the rail(s) 74 and the groove(s) 76 define complementary curved or tapered cross-sectional shapes. Curved/tapered cross-sectional shapes (e.g., such as the illustrated semicircular cross-sectional shape) provide clearance for easy insertion of the rail(s) 74 into the groove(s) 76. However, in alternative embodiments, the rail(s) 74 and the groove(s) 76 may define any other suitable cross-sectional shapes.

Moreover, the container 10 may include any suitable number of rails 74 and grooves 76. For example, in the illustrated embodiment, the container 10 includes two rails 74 on the first side wall 32 and two rails 74 on the lid 42. Moreover, in the illustrated embodiment, the container 10 includes two grooves 76 defined by the second side wall 34 and two grooves 76 defined by the bottom wall 30. However, in alternative embodiments, the container 10 may include any other suitable number of rails 74 and/or grooves 76. Furthermore, the rails 74 and/or grooves 76 may be present on any other suitable walls and/or number of walls.

Additionally, the container 10 may include any other components to support of the growth of the plants 58 within the plant growing chamber 40. For example, container 10 may include one or more cameras or other imaging devices, lighting devices, heating elements, fans, irrigation components, drainage components, and/or the like. Furthermore, the container 10 may include a source of power, such a solar panel, battery, a hook-up to an external source of electricity (e.g., an electric plug), or the like to power such components.

Moreover, in some embodiments, the bottom wall 30, first side wall 32, the second side wall 34, the third side wall 36, the fourth side wall 38, and/or the lid 42 may be formed from a compostable, biodegradable material, such as a compressed biomass and bio-glue composite material. Construction of the container 10 using a biodegradable material permits easy disposal of the container 10 at the end of its life. Specifically, the electronics (e.g., cameras, lights, etc.) can be removed from the container 10 and the container 10 can then be buried or composted for eventual decomposition. The walls 30, 32, 34, 36, 38 and/or the lid 42 may also be 3D printed or otherwise additively formed using coarse natural materials. However, in alternative embodiment, the container 10 may be formed from any other suitable material(s) and/or formed in any other suitable manner.

In addition, the container 10 may be used in a variety of ways to grow and transport crops (e.g., fruits and vegetables) or other plants. For example, the container 10 may be part of a community garden or other small scale urban farming operation that allows people grow plants remotely. Specifically, the container 10 can be stacked vertically and/or horizontally with other containers to increase growing capacity without the large, fixed costs of typical larger scale urban farming operations (e.g., there is no need for a greenhouse). Furthermore, the container 10 may be used to grow and transport high value crops (e.g., grapes, peppers, etc.) to restaurants or stores. Moreover, the container 10 may be used to grow and transport fresh crops to disaster areas or other regions where food is scarce. Additionally, the container 10 could be placed on the roof of a hospital or medical research center and used to grow medicinal herbs. Moreover, the container 10 can be assembled and used on an apartment balcony (e.g., in a city) or in a yard (e.g., adjacent to a house). In addition, the container 10 can be used in a manufacturing facility for air quality improvement and food production for the employees that work there. However, the container 10 may be assembled and/or used in any other suitable location.

Figure 3:
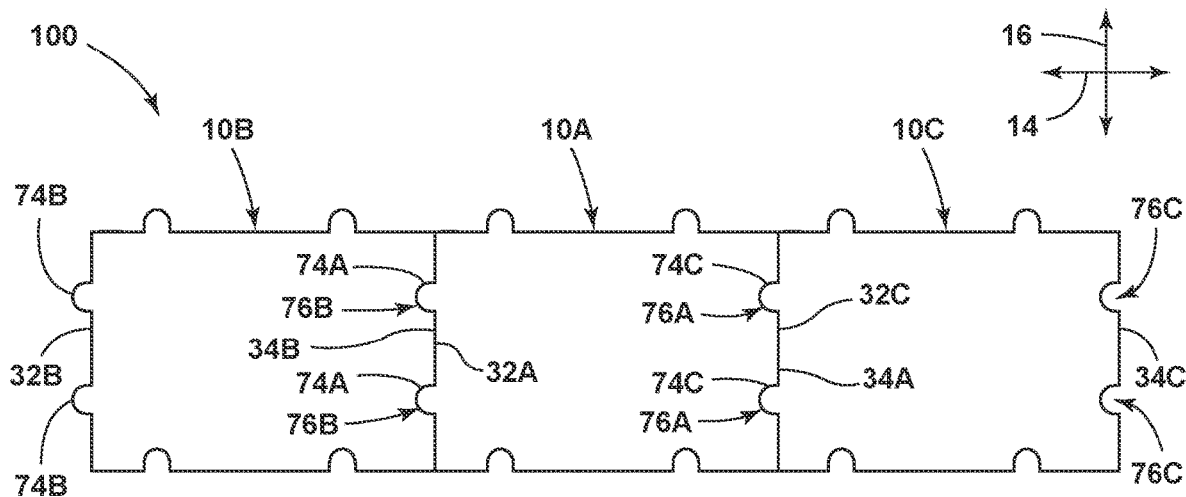
FIG. 3 illustrates a front view of one embodiment of an assembly of containers in accordance with aspects of the present subject matter, particularly illustrating the assembly including first, second, and third containers stacked horizontally.
Figure 4:
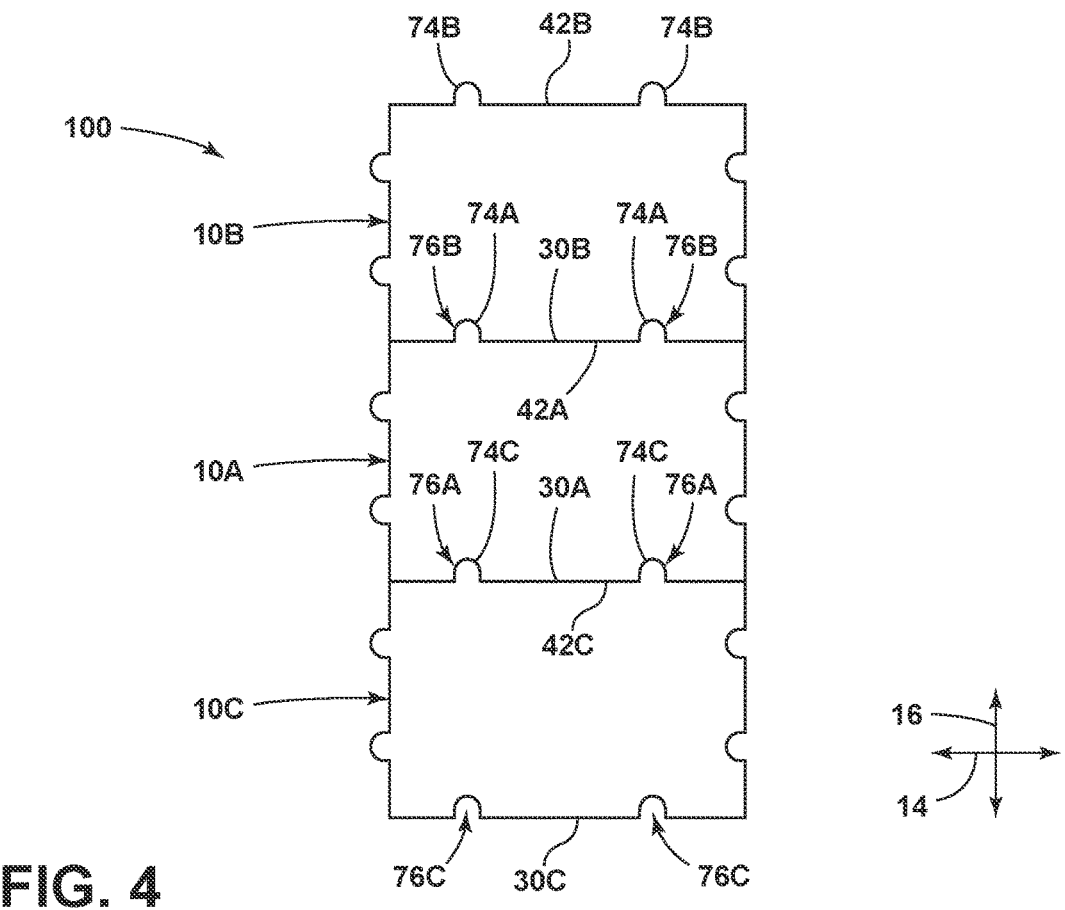
FIG. 4 illustrates a front view of another embodiment of an assembly of containers in accordance with aspects of the present subject matter, particularly illustrating the assembly including first, second, and third containers stacked vertically.

FIGS. 3 and 4 illustrate front views of differing embodiments of an assembly 100 of the containers. Specifically, FIG. 3 illustrates the assembly 100 when the containers are stacked horizontally. Additionally, FIG. 4 illustrates the assembly 100 when the containers are stacked vertically.

In the illustrated embodiments, the assembly 100 includes a first container 10A, a second container 10B, and a third container 10C. However, in alternative embodiments, the assembly 100 may include any other suitable number of containers, such as two containers or four or more containers. Moreover, although FIG. 3 illustrates the containers 10A-C being stacked only horizontally and FIG. 4 illustrates the containers 10A-C being stacked only vertically, the containers of the assembly 100 may, in other embodiments, be stacked both vertically and horizontally, such as on a truck bed.

As shown in FIG. 3, the containers 10A-C are stacked horizontally, such as in the transverse direction 14. More specifically, the first container 10A is positioned relative to the second container 10B such that the rails 74A extending outward from the first side wall 32A of the first container 10A are received within the grooves 76B defined by the second side wall 34B of the second container 10B. Furthermore, the first container 10A is positioned relative to the third container 10C such that the grooves 76A defined by the second side wall 34A of the first container 10A receive the rails 74C extending outward from the first side wall 32C of the third container 10C. Thus, the interlocking of the rails 74A-C and the grooves 76A-C as shown in FIG. 3 allows the containers 10A-C to be removably coupled together, thereby facilitating transportation of such containers 10A-C and/or horizontal alignment and stacking of such containers 10A-C in a growing facility or on a vehicle without the need for racks/shelving or other positioning/alignment/securing devices.

Conversely, as shown in FIG. 4, the containers 10A-C are stacked vertically (i.e., in the vertical direction 16). More specifically, the first container 10A is positioned relative to the second container 10B such that the rails 74A extending outward from the lid 42A of the first container 10A are received within the grooves 76B defined by the bottom wall 30B of the second container 10B. Additionally, the first container 10A is positioned relative to the third container 10C such that the grooves 76A defined by the bottom wall 30A of the first container 10A receive the rails 74C extending outward from the lid 42C of the third container 10C. Thus, the interlocking of the rails 74A-C and the grooves 76A-C as shown in FIG. 4 allows the containers 10A-C to be removably coupled together, thereby facilitating transportation of such containers 10A-C and/or vertical alignment and stacking of such containers 10A-C in a growing facility or on a vehicle without the need for racks/shelving or other positioning/alignment/securing devices.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A container for growing plants, the container comprising:
   a bottom wall;
   a first side wall extending perpendicular to the bottom wall;
   a second side wall extending perpendicular to the bottom wall and parallel to the first side wall such that the bottom wall, the first side wall, and the second side wall at least partially define a plant growing chamber;
   a lid configured to selectively occlude access to the plant growing chamber, the lid being moveable between a closed position at which access to the plant growing chamber is occluded and an opened position at which access to the plant growing chamber is provided; and a locking assembly moveable between a locked position at which the locking assembly prevents movement of the lid from the closed position to the opened position and an unlocked position at which the locking assembly permits movement of the lid from the closed position to the opened position, the locking assembly configured to be remotely actuated by a remote device, wherein one of the bottom wall, the first side wall, the second side wall, or the lid includes a rail and another of the bottom wall, the first side wall, the second side wall, or the lid defines a groove such that the rail of the container is configured to be received within a groove of a first adjacent container and the groove of the container is configured to receive a rail of a second adjacent container.

2. The container of claim 1, wherein the rail extends outward from an exterior surface of the one of the bottom wall, the first side wall, the second side wall, or the lid away from the plant growing chamber and the groove extends inward from an exterior surface of the other of the bottom wall, the first side wall, the second side wall, or the lid toward the plant growing chamber.

3. The container of claim 1, wherein the rail and the groove define complementary cross-sectional shapes.

4. The container of claim 3, wherein the rail and the groove define curved cross-sectional shapes.

5. The container of claim 1, wherein the one of the bottom wall, the first side wall, the second side wall, or the lid is parallel to the other of the bottom wall, the first side wall, the second side wall, or the lid.

6. The container of claim 1, wherein one of the first side wall or the second side wall includes the rail and the other of first side wall or the second side wall defines the groove.

7. The container of claim 6, further comprising:
a third side wall extending perpendicular to the bottom wall and the first and second side walls; and
a fourth side wall extending perpendicular to the bottom wall and the first and second side walls and parallel third side wall.

8. The container of claim 1, wherein one of the bottom wall or the lid includes the rail and the other of bottom wall or the lid defines the groove.

9. The container of claim 8, wherein the lid is parallel to the bottom wall when at the closed position.

10. The container of claim 1, wherein the first side wall and the second side wall are collapsible relative to the bottom wall.

11. The container of claim 1, wherein the lid comprises a transparent window.

12. The container of claim 1, wherein the lid comprises a user interface.

13. The container of claim 1, wherein the bottom wall, the first side wall, the second side wall, and the lid are formed from a biodegradable material.

14. An assembly of containers for growing plants, the assembly comprising:
first, second, and third containers, each container including:
a bottom wall;
a first side wall extending perpendicular to the bottom wall;
a second side wall extending perpendicular to the bottom wall and parallel to the first side wall such that the bottom wall, the first side wall, and the second side wall at least partially define a plant growing chamber;
a lid configured to selectively occlude access to the plant growing chamber, the lid being moveable between a closed position at which access to the plant growing chamber is occluded and an opened position at which access to the plant growing chamber is provided; and
a locking assembly moveable between a locked position at which the locking assembly prevents movement of the lid from the closed position to the opened position and an unlocked position at which the locking assembly permits movement of the lid from the closed position to the opened position, the locking assembly configured to be remotely actuated by a remote device, wherein:
one of the bottom wall, the first side wall, the second side wall, or the lid of the first container includes a rail,
another of the bottom wall, the first side wall, the second side wall, or the lid of the first container defines a groove,
one of the bottom wall, the first side wall, the second side wall, or the lid of the second container includes a groove,
one of the bottom wall, the first side wall, the second side wall, or the lid of the third container includes a rail,
the rail of the first container is received within the groove of the second container, and the groove of the first container receives the rail of the third container.

15. The assembly of claim 14, wherein the rail of the first container and the groove of the second container define complementary cross-sectional shapes and the groove of the first container and the rail of the third container define complementary cross-sectional shapes.

16. The assembly of claim 15, wherein the rail of the first container, the groove of the second container, the groove of the first container, and the rail of the third container define curved cross-sectional shapes.

17. The assembly of claim 14, wherein the one of the bottom wall, the first side wall, the second side wall, or the lid of the first container is parallel to the other of the bottom wall, the first side wall, the second side wall, or the lid of the first container.

18. The assembly of claim 14, wherein one of the first side wall or the second side wall of the first container includes the rail and the other of first side wall or the second side wall of the first container defines the groove.

* * * * *